United States Patent
Wong (10) Patent No.: US 7,330,899 B2
(45) Date of Patent: Feb. 12, 2008

(54) APPARATUS AND METHOD FOR DEVELOPING APPLICATIONS WITH TELEPHONY FUNCTIONALITY

(75) Inventor: Johnny Wong, Richmond, CA (US)

(73) Assignee: Oracle International Corporation, Redwood Shores, CA (US)

( * ) Notice: Subject to any disclaimer, the term of this patent is extended or adjusted under 35 U.S.C. 154(b) by 918 days.

(21) Appl. No.: 10/682,946

(22) Filed: Oct. 9, 2003

(65) Prior Publication Data

US 2004/0258238 A1 Dec. 23, 2004

Related U.S. Application Data

(60) Provisional application No. 60/476,771, filed on Jun. 5, 2003.

(51) Int. Cl.

| | |
|---|---|
| *G06F 15/16* | (2006.01) |
| *G06F 15/173* | (2006.01) |
| *H04M 1/56* | (2006.01) |
| *H04M 15/06* | (2006.01) |
| *H04M 12/56* | (2006.01) |
| *H04L 12/50* | (2006.01) |
| *G06F 11/00* | (2006.01) |
| *H04M 11/00* | (2006.01) |
| *H04M 3/00* | (2006.01) |
| *H04Q 11/00* | (2006.01) |
| *H04L 12/28* | (2006.01) |

(52) U.S. Cl. ............... 709/230; 709/203; 709/217; 709/218; 709/219; 709/229; 709/239; 709/249; 379/93.14; 379/142.15; 379/196; 370/237; 370/360; 370/395.2; 370/401

(58) Field of Classification Search ............. 709/203, 709/206, 207, 217–220, 226, 229, 230, 239, 709/249; 379/93.09, 93.14, 142.15, 196; 370/237, 354, 360, 395.2, 395.43, 395.5, 370/401
See application file for complete search history.

(56) References Cited

U.S. PATENT DOCUMENTS 6,920,425 B1 * 7/2005 Will et al. ............. 704/275

(Continued)

FOREIGN PATENT DOCUMENTS

EP 1202528 A2 * 5/2002

(Continued)

OTHER PUBLICATIONS

Singh, Kundan, et al. "Integrating VoiceXML with SIP Services," IEEE International Conference on Communications, vol. 2, May 11-15, 2003, pp. 784-788.*

(Continued)

*Primary Examiner*—Melvin H. Pollack
(74) *Attorney, Agent, or Firm*—Park, Vaughan & Fleming LLP (57) ABSTRACT

One embodiment of the present invention provides a system that facilitates developing applications with telephony functionality. The system includes a session initiation protocol (SIP) gateway configured to interface with a public switched telephone network (PSTN). The SIP gateway translates telephone calls from telephones coupled to the PSTN to SIP protocol messages. A SIP server coupled to the SIP gateway accepts these SIP protocol messages and an application server accesses a voice extensible markup language (VXML) page on behalf of the SIP server. A VXML gateway provides access to the VXML page by a users of the telephones.

21 Claims, 8 Drawing Sheets

U.S. PATENT DOCUMENTS

| | | | |
|---|---|---|---|
| 6,922,411 B1* | 7/2005 | Taylor | 370/401 |
| 6,961,776 B1* | 11/2005 | Buckingham et al. | 709/229 |
| 6,978,132 B1* | 12/2005 | Sladek et al. | 455/432.2 |
| 7,054,939 B2* | 5/2006 | Koch et al. | 709/227 |
| 7,061,928 B2* | 6/2006 | Giroti et al. | 370/422 |
| 7,065,069 B1* | 6/2006 | Echols | 370/352 |
| 7,085,821 B2* | 8/2006 | Creamer et al. | 709/219 |
| 7,095,733 B1* | 8/2006 | Yarlagadda et al. | 370/352 |
| 7,127,400 B2* | 10/2006 | Koch | 704/270.1 |
| 7,149,772 B1* | 12/2006 | Kalavade | 709/203 |
| 7,184,534 B2* | 2/2007 | Birch et al. | 379/211.01 |
| 7,185,094 B2* | 2/2007 | Marquette et al. | 709/225 |
| 7,215,663 B1* | 5/2007 | Radulovic | 370/356 |
| 7,239,629 B1* | 7/2007 | Olshansky et al. | 370/353 |
| 7,245,611 B2* | 7/2007 | Narasimhan et al. | 370/354 |
| 7,266,611 B2* | 9/2007 | Jabri et al. | 709/231 |
| 2003/0120502 A1* | 6/2003 | Robb et al. | 705/1 |
| 2003/0149774 A1* | 8/2003 | McConnell et al. | 709/227 |
| 2003/0171925 A1* | 9/2003 | Werner | 704/270.1 |
| 2003/0187992 A1* | 10/2003 | Steenfeldt et al. | 709/227 |
| 2003/0215068 A1* | 11/2003 | Stein et al. | 379/88.17 |
| 2003/0215080 A1* | 11/2003 | Wengrovitz | 379/219 |
| 2004/0010431 A1* | 1/2004 | Thomas et al. | 705/7 |
| 2004/0158606 A1* | 8/2004 | Tsai | 709/203 |
| 2004/0186883 A1* | 9/2004 | Nyman et al. | 709/203 |
| 2004/0199649 A1* | 10/2004 | Tarnanen et al. | 709/230 |
| 2004/0220810 A1* | 11/2004 | Leask et al. | 704/270.1 |
| 2004/0246822 A1* | 12/2004 | Wong | 369/2 |
| 2004/0246947 A1* | 12/2004 | Wong | 370/352 |
| 2004/0249951 A1* | 12/2004 | Grabelsky et al. | 709/227 |
| 2005/0193123 A9* | 9/2005 | Bach Corneliussen | 709/228 |
| 2006/0168095 A1* | 7/2006 | Sharma et al. | 709/217 |

FOREIGN PATENT DOCUMENTS

| | | | |
|---|---|---|---|
| WO | WO 9731492 A1 * | 8/1997 | |
| WO | WO 03040942 A1 * | 5/2003 | |

OTHER PUBLICATIONS

Vemuri, A. and Peterson, J. "Session Initiation Protocol for Telephones (SIP-T): Context and Architectures," RFC 3372, Sep. 2002, pp. 1-23.*

Petrack, S. and Conroy, L. "The PINT Service Protocol: Extensions to SIP and SDP for IP Access to Telephone Call Services," RFC 2848, Jun. 2000, pp. 1-73.*

Krishnaswamy, M. and Romascanu, D. "Management Information Base for the PINT Services Architecture," RFC 3055, Feb. 2001, pp. 1-21.*

Faynberg, I. et al. "Service in the Public Switched Telephone Network/Intelligent Network (PSTN/IN) Requesting In Ternet Service (SPIRITS) Protocol Requirements," RFC 3298, Aug. 2002, pp. 1-17.*

Vemuri, A. and Peterson, J. "Session Initiation Protocol for Telephones (SIP-T): Context and Architectures," RFC 3372, Sep. 2002, pp. 1-23 and Errata.*

Camarillo, G. et al. "Integrated Services Digital Network (ISDN) User Part (ISUP) to Session Initiation Protocol (SIP) Mapping," RFC 3398, Nov. 2002, pp. 1-68.*

* cited by examiner

APPARATUS AND METHOD FOR DEVELOPING APPLICATIONS WITH TELEPHONY FUNCTIONALITY

RELATED APPLICATION

This application hereby claims priority under 35 U.S.C. § 119 to U.S. Provisional Patent Application No. 60/476,771 filed on Jun. 5, 2003, entitled "Unified Telephony Platform," by inventor Johnny Wong.

The subject matter of this application is related to the subject matter in a co-pending non-provisional application by the same inventor as the instant application entitled, "Method and Apparatus for Providing Web Service Access to Telephony Functionality," having Ser. No. 10/655,647, and filing date Sep. 4, 2003 and in a co-pending non-provisional application by the same inventor as the instant application entitled, "Apparatus and Method for Providing a Unified Telephony Solution," having Ser. No. 10/642,251, and filing date Aug. 14, 2003.

BACKGROUND

1. Field of the Invention

The present invention relates to systems that provide telephony services. More specifically, the present invention relates to an apparatus and a method for developing applications with telephony functionality.

2. Related Art

Modern telephony systems support voice applications that provide essential services and capabilities to modern business enterprises. For example, these voice applications can support call centers, voice mail, conferencing, and next generation application functions, such as wake-up calls and stock alerts.

Current systems can provide these services through a voice extensible markup language (VXML) gateway that acts as an interface between an application server and the public switched telephone network (PSTN). This allows the application server to provide VXML pages to the VXML gateway. The VMXL gateway uses these VXML pages to interface with a user.

In doing so, the user may select an option from the VXML page that switches the incoming call from the service representative to a telephone within the company that belongs to the user. The VXML gateway facilitates this switching operation. At the end of the call, the user can be switched back to the application server to access a different service.

One problem with this technique is that it ties up ports on the VXML server needlessly. One port is used for the incoming call and a second port is used to make the connection to the user's telephone within the company. Using two ports to connect an external telephone with an internal telephone is a very expensive solution because the VXML ports are expensive to install and maintain.

One technique for freeing ports used in this way is for the call center application to perform a "blind switch" to the internal telephone. In this technique, the incoming call is coupled directly to the internal telephone without the VXML gateway in the loop. However, because the VXML gateway is not in the loop, the user cannot regain access to the VXML gateway without hanging up the telephone and redialing the call center application.

Hence, what is needed is an apparatus and a method for developing applications with telephony functionality without the problems described above.

SUMMARY

One embodiment of the present invention provides a system that facilitates developing applications with telephony functionality. The system includes a session initiation protocol (SIP) gateway configured to interface with a public switched telephone network (PSTN). This SIP gateway translates telephone calls originating from the PSTN into SIP protocol messages. A SIP server coupled to the SIP gateway accepts these SIP protocol messages and passes them to an application server, which accesses a voice extensible markup language (VXML) page on behalf of the SIP server. A VXML gateway provides access to the VXML page by users of telephones coupled to the PSTN.

In a variation of this embodiment, the SIP gateway accesses a specified VXML page to provide a requested function for the user.

In a further variation, the application server provides a web service message to the SIP gateway, wherein the web service message provides a connection status of the telephone call.

In a further variation, the application server provides a web service message to the SIP gateway, wherein the web service message can be used to control the telephone call by performing operations such as connecting, disconnecting, and redirecting the telephone call.

In a further variation, the application server can initiate telephone calls from the SIP gateway to a telephone coupled to the PSTN.

In a further variation, the application server provides a web page to the user, wherein the web page can be used to control access to advanced functions. These advanced functions include wake-up call applications, stock alert applications, and the like.

In a further variation, the SIP gateway switches a voice portion of the telephone call from the VXML gateway to the user's telephone thereby releasing the VXML gateway from service when the user is not accessing the VXML page.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Telephony Solution

Figure 1:
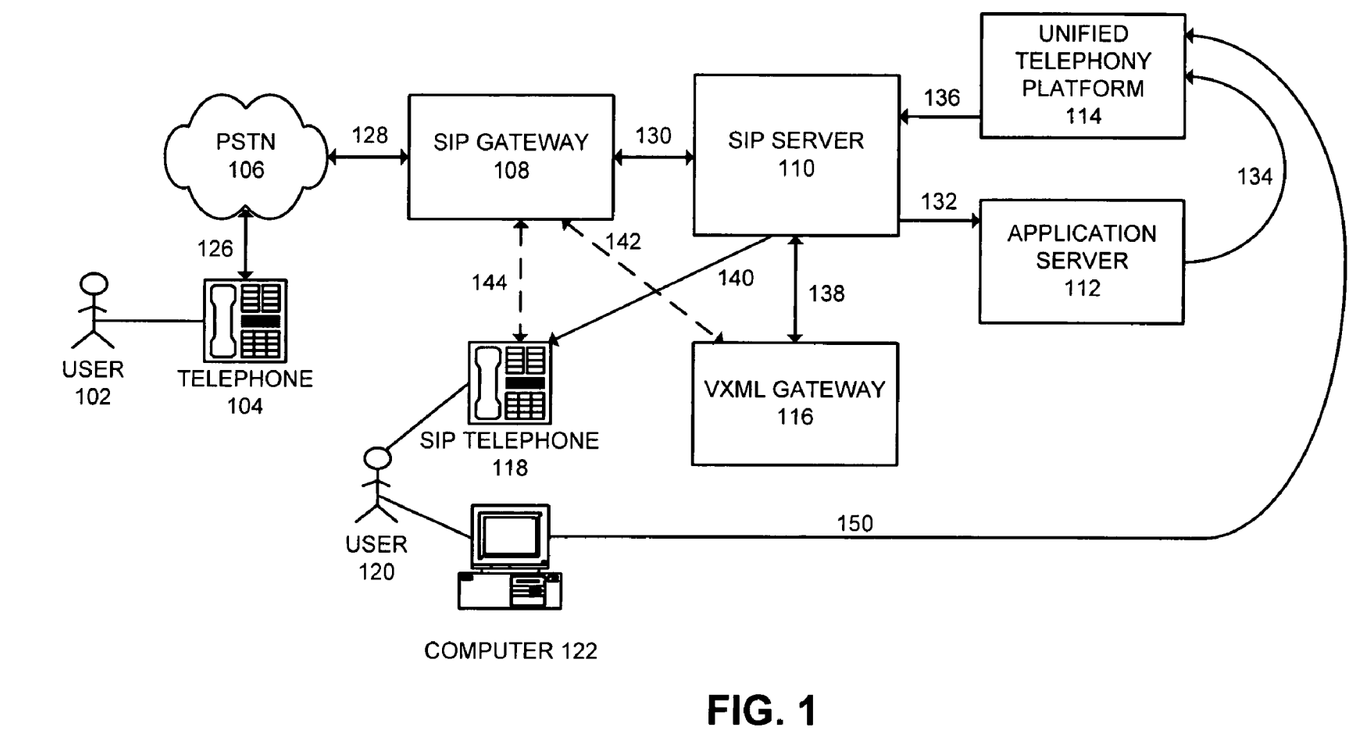
FIG. 1 illustrates a telephony solution in accordance with an embodiment of the present invention.

FIG. 1 illustrates a telephony solution in accordance with an embodiment of the present invention. The system includes telephone 104, public switched telephone network (PSTN) 106, session initiation protocol (SIP) gateway 108, SIP server 110, application server 112, unified telephony platform 114, voice extensible markup language (VXML) gateway 116, SIP telephone 118, and computer 122.

Telephone 104 can be any telephone including cellular telephones and their associated cellular mechanisms that can be coupled to PSTN 106. SIP server 110 includes a SIP servlet container and SIP servlets, which are not shown.

The system operates generally as follows. User 102 uses telephone 104 to connect with PSTN 106 as connection 126. PSTN 106 couples connection 126 from telephone 104 to SIP gateway 108 as connection 128. Note that connections 126 and 128 include both signaling information and voice signals.

SIP gateway 108 uses the signaling information from connection 128 to access SIP server 110 on link 130. This signaling information identifies the application that is being requested from application server 112. This application can be identified from the telephone number called by user 102 and can include, for example, a call center application.

SIP server 110 sends this application data to application server 112 across connection 132. Next, application server 112 access the associated application, which sends web services message 134 to unified telephony platform 114. Unified telephony platform 114 then performs a remote method invocation (RMI) to a corresponding SIP servlet in SIP server 110.

This SIP servlet signals SIP gateway 108 to switch the voice signal portion of connection 126 to VXML gateway 116 as connection 142. Additionally, the SIP servlet sends data across coupling 138 to VXML gateway 116 to allow user 102 to converse with VXML gateway 116.

At some point during the telephone call, VXML gateway 116 can be directed to switch the telephone call to user 120. This can be accomplished as follows. VXML gateway 116 signals SIP server 110 that the connection needs to be switched. Next, SIP server 110 signals VXML gateway to disconnect connection 142, and also signals SIP telephone 118 across coupling 140 to accept an incoming call. SIP server 110 also signals SIP gateway 108 to switch the voice portion of connection 128 to SIP telephone 118 across coupling 144. This enables user 120 to converse with user 102 through SIP telephone 118. Note that VXML gateway 116 is removed from the telephone call thereby releasing any ports on VXML gateway 116 that were being used for the telephone call.

When the conversation between user 102 and user 120 is finished, user 120 can use computer 122 to send web services message 150 to unified telephony platform 114. This causes unified telephony platform 114 to switch the voice portion of connection 128 back to VXML gateway 116 for further voice access to the application. Note that computer 122 can be used to query the status of the transfer and can provide contingency functions if SIP gateway 108 fails to transfer the call to VXML gateway 116 (if, for example, all of the ports of VXML gateway 116 are currently busy).

Click-to-Dial Application

Figure 2:
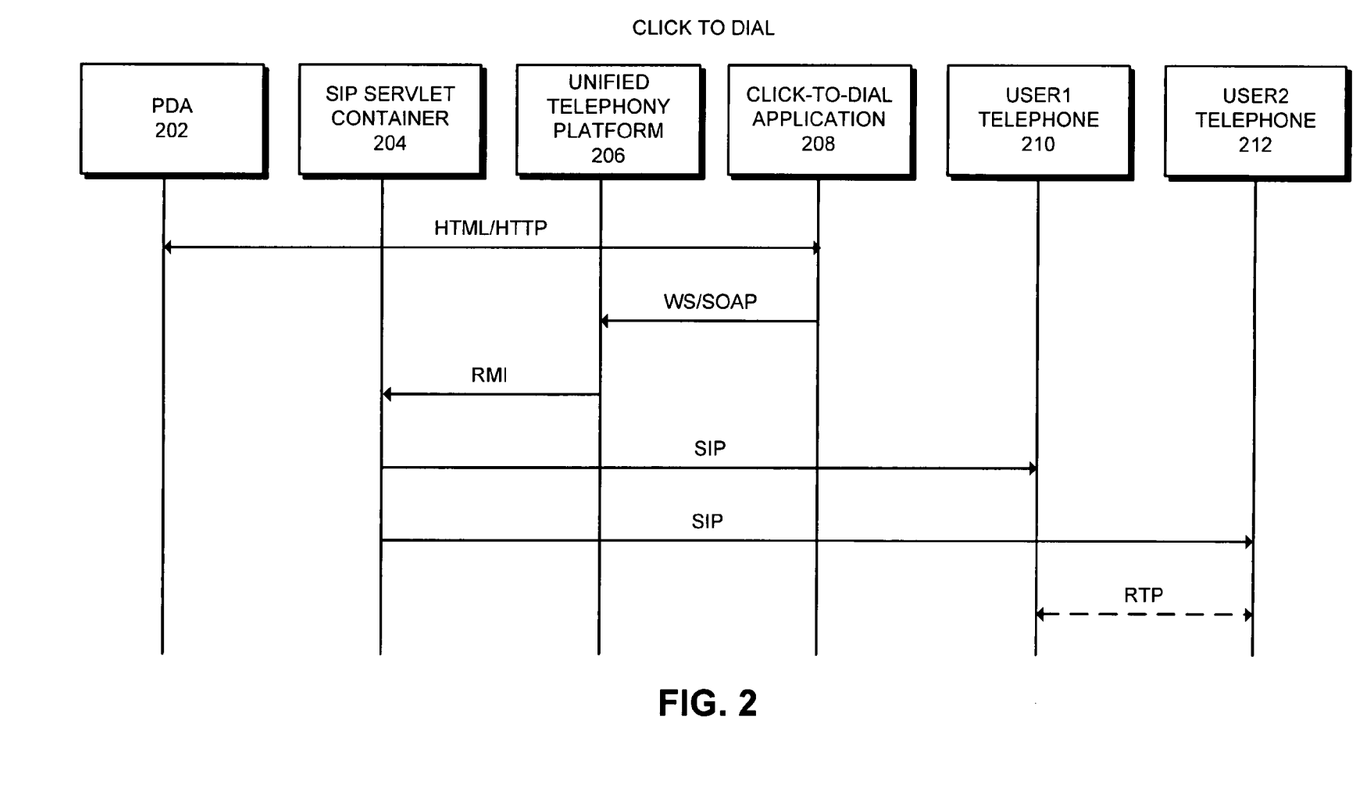
FIG. 2 provides an activity diagram of a click-to-dial application in accordance with an embodiment of the present invention.

FIG. 2 provides an activity diagram of an exemplary click-to-dial application in accordance with an embodiment of the present invention. In this example, a user can select a desired phone number through personal digital assistant (PDA) 202. This phone number is then transferred to click-to-dial application 208 using hypertext markup language/hypertext transfer protocol (HTML/HTTP). Next, click-to-dial application 208 transfers the phone number to unified telephony platform 206 through web service/simple object access protocol (WS/SOAP).

Unified telephony platform 206 subsequently uses remote method invocation (RMI) to access the proper SIP servlet within SIP servlet container 204. This RMI can take place through an RMI registry. The SIP servlet within SIP servlet container 204 sends a SIP message to user1 telephone 210 and a SIP message to user2 telephone 212. These SIP messages cause user1 telephone 210 and user2 telephone 212 to initiate a real-time transport protocol (RTP) session. User 1 and user 2 can then communicate with each other over the RTP session.

Conferencing Application

Figure 3:
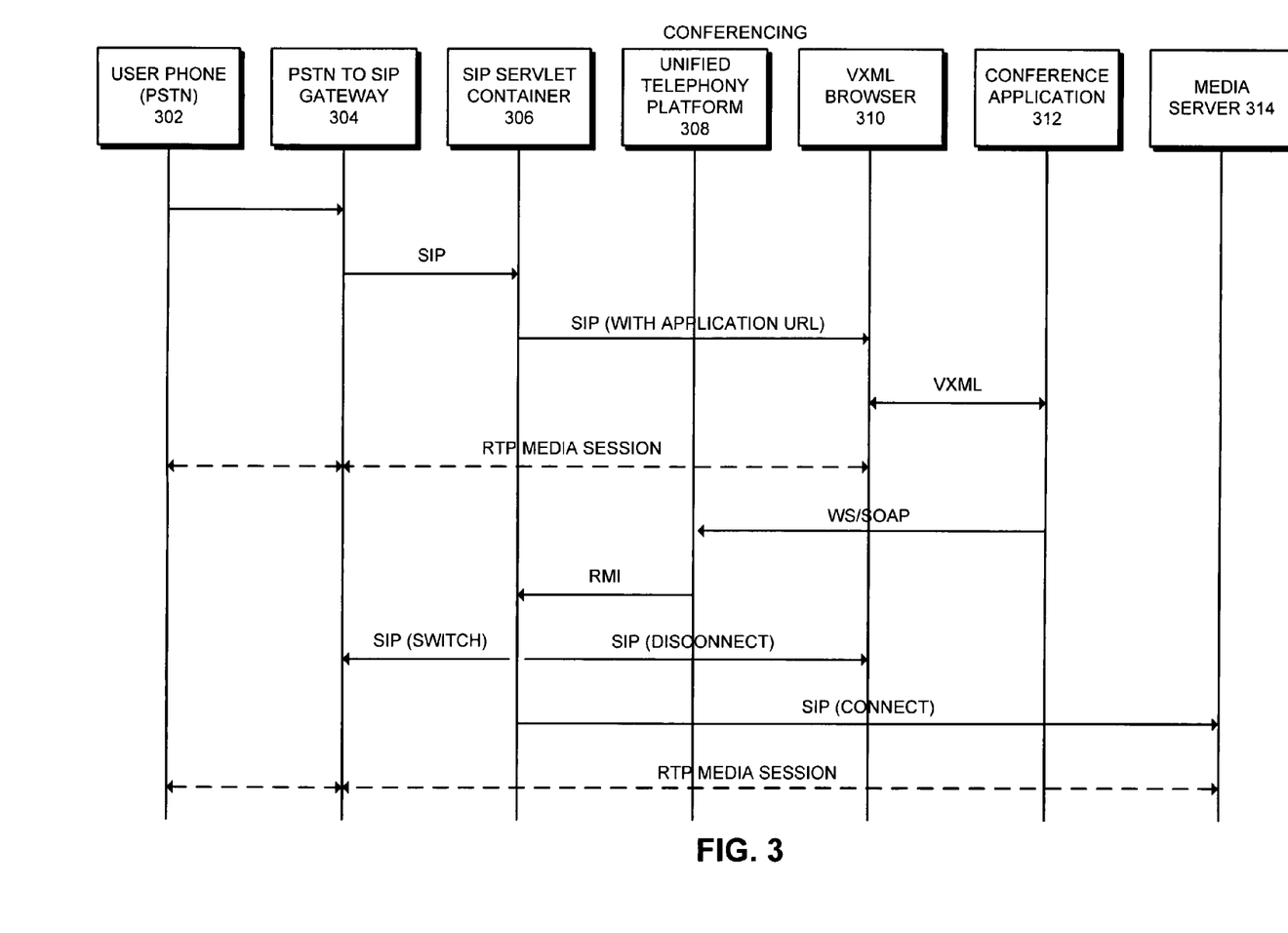
FIG. 3 provides an activity diagram of a conferencing application in accordance with an embodiment of the present invention.

FIG. 3 provides an activity diagram of a teleconferencing application in accordance with an embodiment of the present invention. In this example, a user wishing to join a conference call can initiate a call from a user phone on the public switched telephone network (PSTN) 302. PSTN-to-SIP gateway 304 then sends a SIP message to a SIP servlet within SIP servlet container 306 to join the conference call. Next, the SIP servlet within SIP servlet container 306 sends a SIP message including an application URL to voice extensible markup language (VXML) browser 310.

VXML browser 310 then communicates with conference application 312 to establish parameters for joining the conference call, including the location of the media server, in this case media server 314. VXML browser 310 also establishes an RTP media session through PSTN to SIP gateway 304 to user phone (PSTN) 302. This RTP media session allows the user at user phone (PSTN) 302 to communicate with VXML browser 310.

Once the proper conference is identified, conference application 312 initiates a WS/SOAP message to unified telephony platform 308 to join the conference call. In response, unified telephony platform 308 performs a remote method invocation to a servlet within SIP servlet container 306.

The servlet within SIP servlet container 306 then initiates a SIP disconnect message to VXML browser 310 and a SIP switch message to PSTN to SIP gateway 304. The SIP servlet also initiates a SIP connect message to media server 314. These messages cause the RTP session between user phone (PSTN) 302 and VXML browser 310 to be dropped and an RTP session to be established between user phone (PSTN) 302 and media server 314.

Application-Initiated Conferencing

Figure 4:
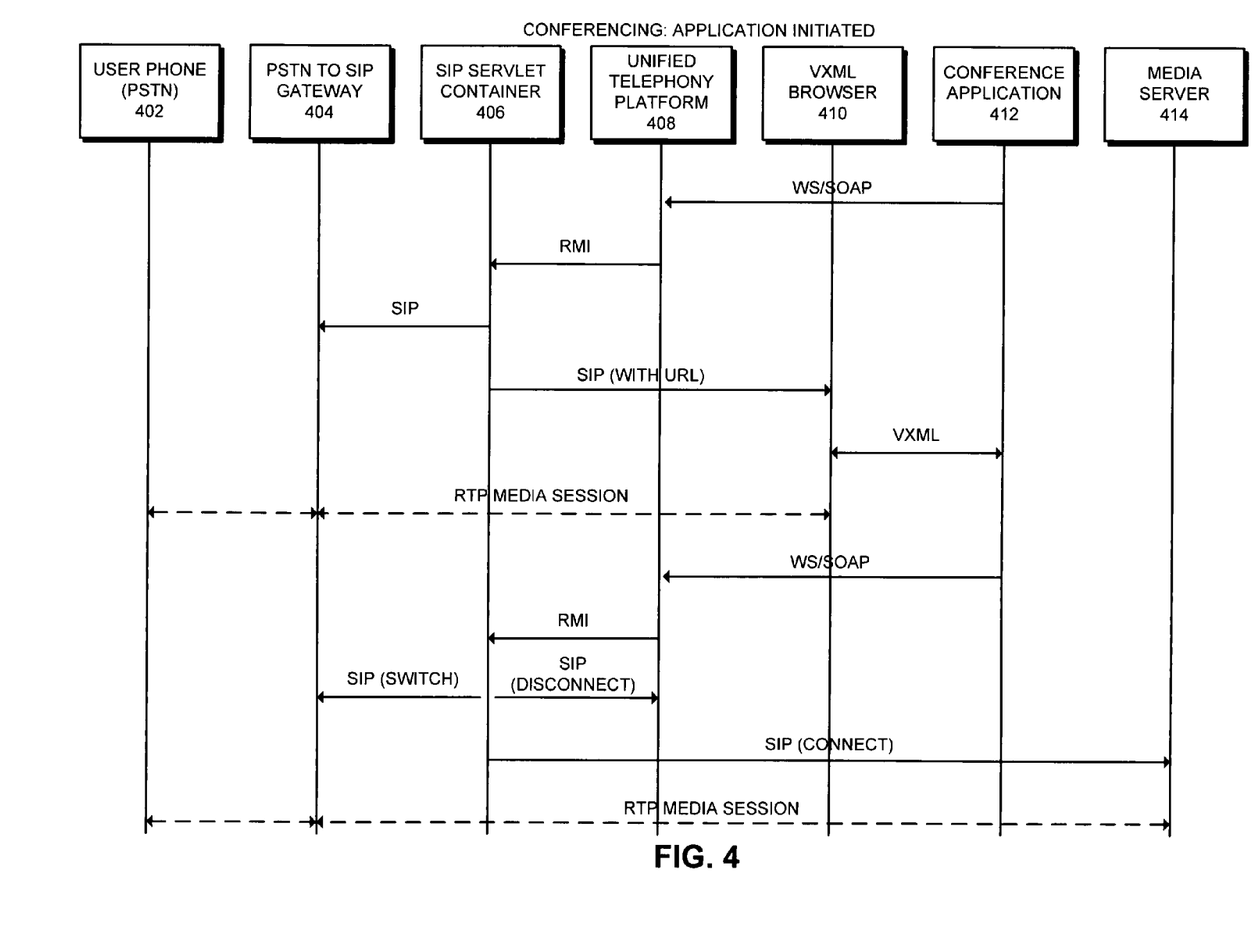
FIG. 4 provides an activity diagram of application-initiated conferencing in accordance with an embodiment of the present invention.

FIG. 4 provides an activity diagram of application-initiated conferencing in accordance with an embodiment of the present invention. In this example, conference application 412 initiates a WS/SOAP message to unified telephony platform 408 to invite user phone (PSTN) 402 to join the conference call. In response, unified telephony platform 408 performs a remote method invocation to a SIP servlet within SIP servlet container 406.

To initiate the connection, the SIP servlet sends a SIP message to PSTN to SIP gateway 404. The SIP servlet also sends a SIP message with a URL to VXML browser 410. VXML browser 410 then communicates with conference application 412 using VXML and also communicates with user phone (PSTN) 402 across an RTP media session.

After establishing that the user is available at user phone (PSTN) 402, conference application 412 issues a WS/SOAP message to unified telephony platform 408 to switch user phone (PSTN) 402 to the conference call. In response to this message, unified telephony platform 408 performs a remote method invocation to a SIP servlet within SIP servlet container 406.

The SIP servlet then issues a SIP (switch) message to PSTN to SIP gateway 404, a SIP (disconnect) message to unified telephony platform 408, and a SIP connect message to media server 414. These SIP messages cause user phone (PSTN) 402 to be connected to media server 414 across an RTP media session thereby joining the conference call.

Call Center Application

Figure 5:
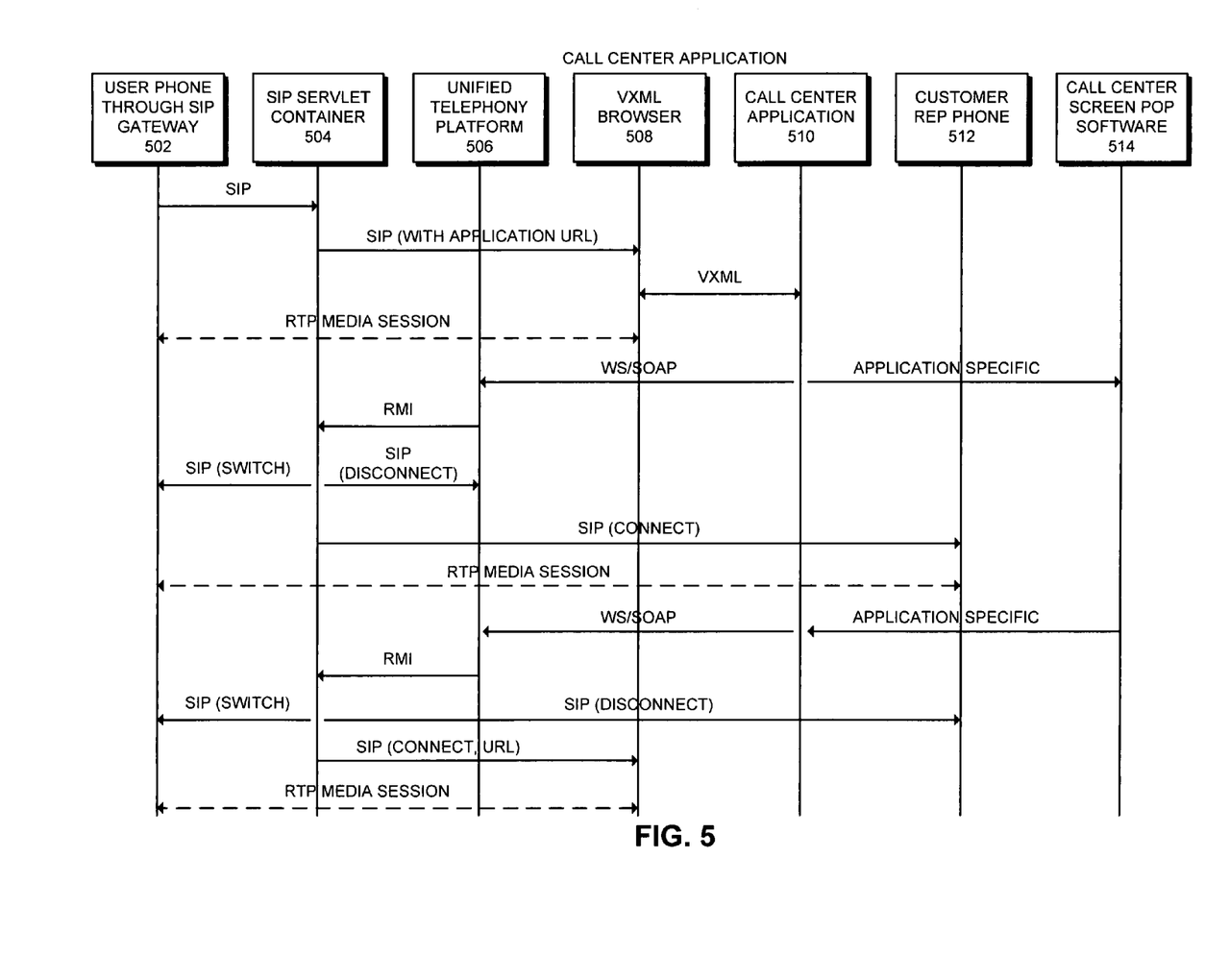
FIG. 5 provides an activity diagram for a call center application in accordance with an embodiment of the present invention.

FIG. 5 provides an activity diagram of an exemplary call center application in accordance with an embodiment of the present invention. First, a user contacts the call center connects to a SIP servlet within SIP servlet container 504 from user phone through SIP gateway 502. In response, the SIP servlet sends a SIP message with an application URL to VXML browser 508. VXML browser 508 then establishes a VSML session with call center application 510 and an RTP media session with user phone through SIP gateway 502.

After the user selects the desired option from call center application 510, call center application 510 sends a WS/SOAP message to unified telephony platform 506 and an application specific message to call center screen pop software 514. In response to the WS/SOAP message, unified telephony platform 506 invokes a SIP servlet within SIP servlet container 504 using remote method invocation. This SIP servlet sends a SIP switch message to user phone through SIP gateway 502, a SIP disconnect message to unified telephony platform 506, and a SIP connect message to customer rep phone 512. These messages connect user phone through SIP gateway 502 to customer rep phone 512 across an RTP media session.

After the user finishes conducting business with the customer service representative, call center screen pop software 514 sends an application specific message to call center application 510. In response, call center application 510 sends a WS/SOAP message to unified telephony platform 506 to switch the user back to VXML browser 508. Next, unified telephony platform 506 makes a remote method invocation to a SIP servlet within SIP servlet container 504. This SIP servlet issues a SIP switch command to user phone through SIP gateway 502, a SIP disconnect command to customer rep phone 512, and a SIP connect with URL command to VXML browser 508. These commands connect user phone through SIP gateway 502 to VXML browser 508 using an RTP media session.

Voicemail Application

Figure 6:
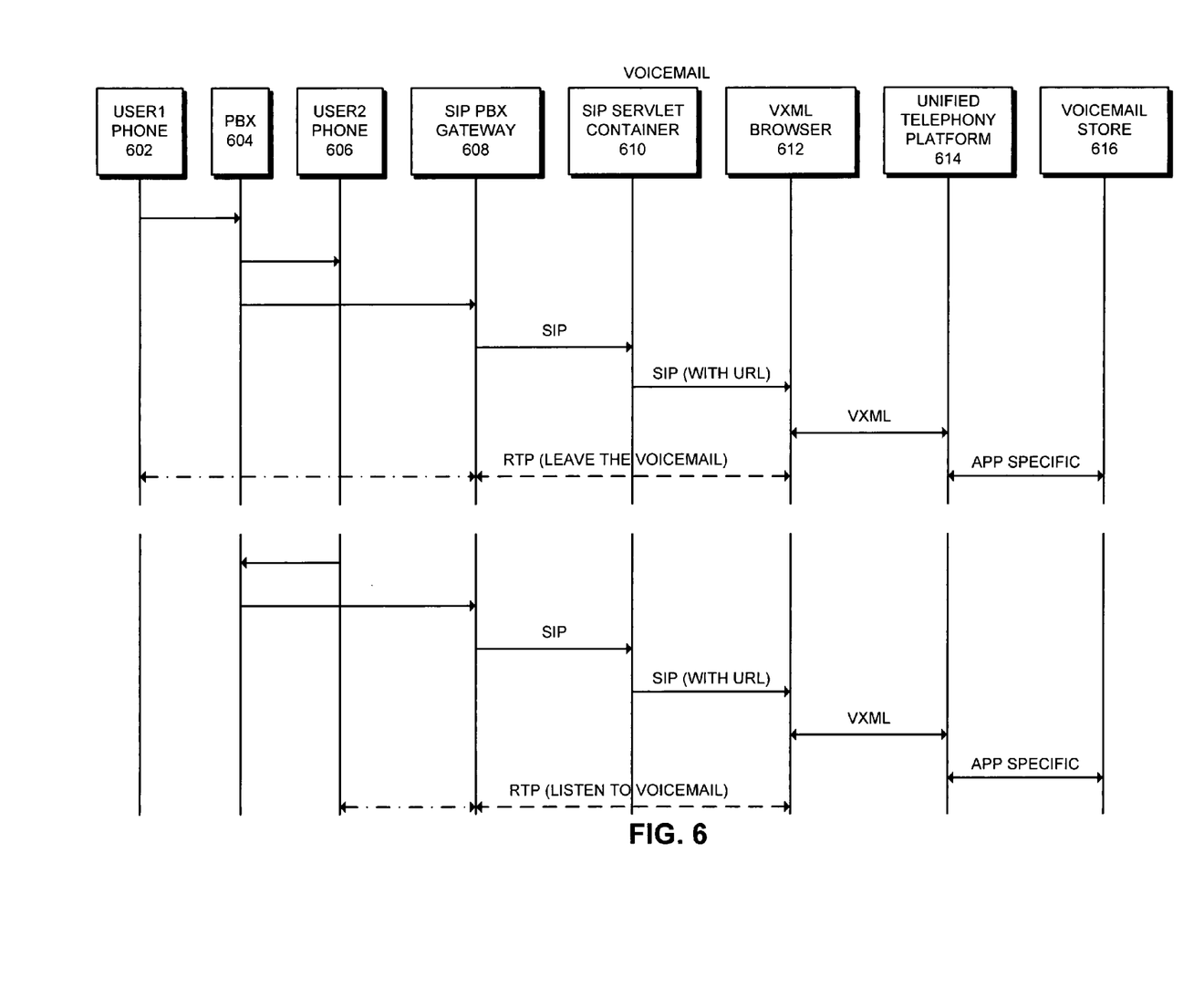
FIG. 6 provides an activity diagram for a voicemail application in accordance with an embodiment of the present invention.

FIG. 6 provides an activity diagram of an exemplary voicemail application in accordance with an embodiment of the present invention. In this example, a first user at user1 phone 602 attempts to reach a second user at user2 phone 606 through PBX 604. After a specified number of rings with no answer at user2 phone 606, PBX 604 disconnects from user2 phone 606 and connects to SIP-PBX gateway 608. SIP-PBX gateway 608 then sends a SIP message to a SIP servlet within SIP servlet container 610. This causes the SIP servlet to send a SIP message with a URL to VXML browser 612.

Next, VXML browser 612 initiates a VXML session with a voicemail application running on unified telephony platform 614 and an RTP session through SIP PBX gateway 608 to user1 phone 602 so the first user can leave a voicemail message. The voicemail application running on unified telephony platform 614 then connects to voicemail store 616 to store the incoming voicemail message.

At a later time, the second user connects to PBX 604 using user2 phone 606 to retrieve the voicemail message. In response, PBX 604 connects to SIP-PBX gateway 608. SIP-PBX gateway 608 then sends a SIP message to a SIP servlet within SIP servlet container 610 requesting retrieval of the voicemail message.

Next, the SIP servlet sends a SIP message with a URL to VXML browser 612. VXML browser 612 then establishes a VXML session with the voicemail application in unified telephony platform 614 and an RTP session with user2 phone 606 through SIP PBX gateway 608. The voicemail application in unified telephony platform 614 then connects to voicemail store 616 to retrieve the voicemail message and provide the voicemail message to the second user at user2 phone 606.

PBX Functionality

Figure 7:
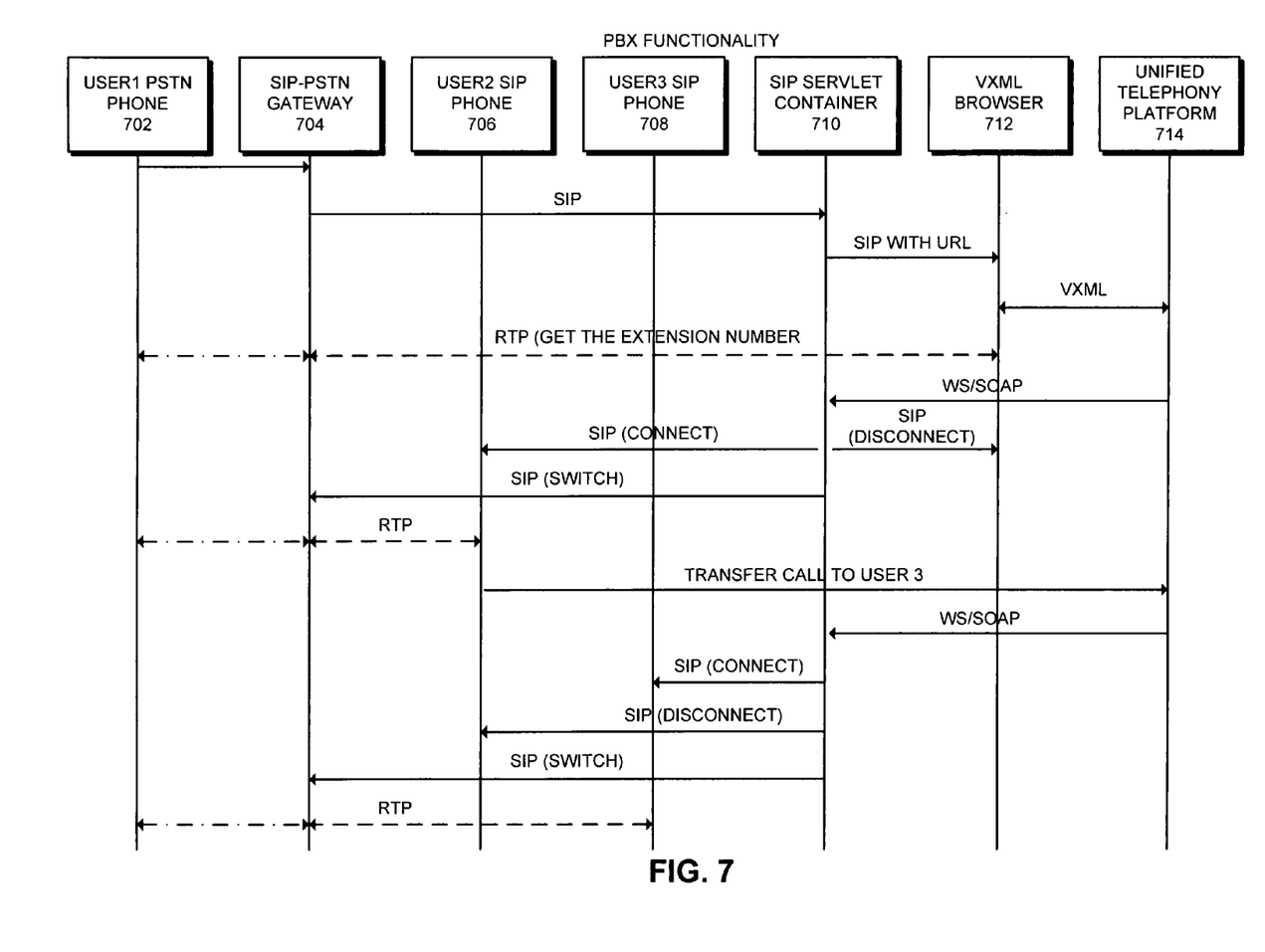
FIG. 7 provides an activity diagram of PBX functionality in accordance with an embodiment of the present invention.

FIG. 7 provides an activity diagram of exemplary PBX operations in accordance with an embodiment of the present invention. In this example, a first user initially connects to SIP-PSTN gateway 704 through user1 PSTN phone 702. In response, user1 PSTN phone 702 sends a SIP message to a SIP servlet within SIP servlet container 710. This SIP servlet, in turn, sends a SIP message with a URL to VXML browser 712.

Next, VXML browser 712 establishes a VXML session with unified telephony platform 714 and an RTP session with user1 PSTN phone 702 through SIP-PSTN gateway 704. The first user can then retrieve the extension number for a second user from unified telephony platform 714. Next, the first user can send a request to unified telephony platform 714 indicating that a connection with the second user is desired.

If the first user requests the connection, unified telephony platform 714 sends a WS/SOAP message to a SIP servlet in SIP servlet container 710 to make the connection. In response, the SIP servlet sends a SIP connect message to user2 SIP phone, a disconnect message to VXML browser 712, and a switch message to SIP-PSTN gateway 704. These messages connect user 1 PSTN phone to user2 SIP phone across SIP-PSTN gateway 704.

If the second user desires to transfer the call to a third user, the second user can initiate the call transfer by sending a message from user2 SIP phone 706 to unified telephony platform 714. In response to this message, unified telephony platform 714 sends a WS/SOAP message to a SIP servlet in SIP servlet container 710 to transfer the connection. The SIP servlet then sends a SIP connect message to user3 SIP phone 708, a SIP disconnect message to user2 SIP phone 706, and a SIP switch message to SIP-PSTN gateway 704. These messages cause the RTP session to be transferred to user3 SIP phone 708.

Initiating Calls

Figure 8:
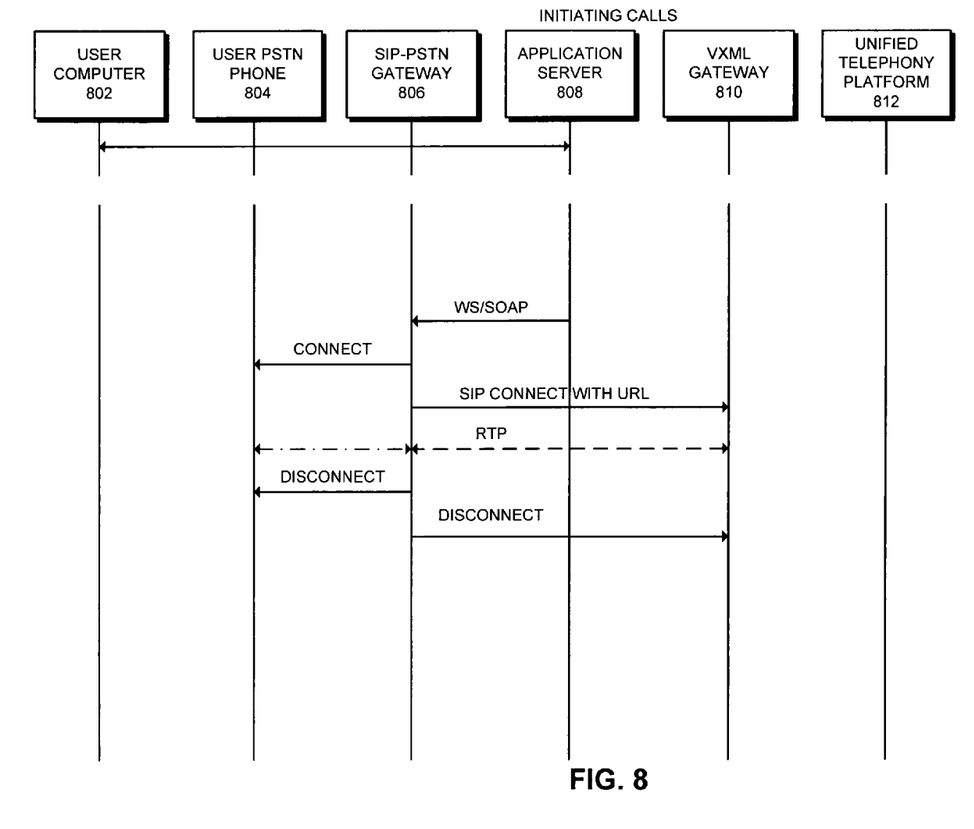
FIG. 8 provides an activity diagram for initiating calls in accordance with an embodiment of the present invention.

FIG. 8 provides an activity diagram for application-initiated calls in accordance with an embodiment of the present invention. The example provided in FIG. 8 is a wake-up call application. However, the same operations apply to other application-initiated calls, such as stock price alerts.

As is illustrated in FIG. 8, a user desiring a wake-up call access application server 808 through computer 802 to configure the wake-up time and the telephone number to be called. Note that the user can set other parameters as defined by the wake-up application.

When the time arrives for the wake-up call, application server 808 sends a web services message to SIP-PSTN gateway 806 to establish a connection with user1 PSTN phone 804. SIP-PSTN gateway 806 also sends a SIP connect message with a URL for the wake-up dialog to VXML gateway 810.

These connections establish a voice RTP session between USER1 PSTN phone 804 and VXML gateway 810 through SIP-PSTN gateway 806. Upon completion of the wake-up call, SIP-PSTN gateway 806 sends disconnect messages to both USER1 PSTN phone 804 and VXML gateway 810. This causes the call to be disconnected.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for developing applications with telephony functionality, comprising:
   a session initiation protocol (SIP) gateway configured to interface with a public switched telephone network (PSTN), wherein the SIP gateway translates a telephone call from a telephone coupled to the PSTN into a SIP protocol message, and wherein the SIP gateway switches the voice portion separately from the signaling information of the same telephone call;
   a SIP server coupled to the SIP gateway to accept the SIP protocol message;
   an application server configured to access a voice extensible markup language (VXML) page on behalf of the SIP server; and
   a VXML gateway configured to allow a user of the telephone access to the VXML page, wherein the VXML gateway can be de-coupled from and re-coupled to the SIP gateway during the same telephone call.

2. The apparatus of claim 1, wherein the SIP gateway is further configured to access a specified VXML page to provide a requested function for the user.

3. The apparatus of claim 1, wherein the application server is further configured to provide a web service message to the SIP gateway, wherein the web service message provides a connection status of the telephone call.

4. The apparatus of claim 1, wherein the application server is further configured to provide a web service message to the SIP gateway, wherein the web service message can be used to control the telephone call; wherein control functions include connection, disconnection, and redirection.

5. The apparatus of claim 1, wherein the application server can initiate telephone calls from the SIP gateway to the telephone coupled to the PSTN.

6. The apparatus of claim 1, wherein the application server is further configured to provide a web page to the user, wherein the web page can be used to control access to advanced functions, and wherein advanced functions include a wake-up call application and a stock alert application.

7. The apparatus of claim 1, wherein the SIP gateway switches a voice portion of the telephone call from the VXML gateway to the user's telephone thereby releasing the VXML gateway from service when the user is not accessing the VXML page.

8. A method for developing applications with telephony functionality, comprising:
   interfacing with a public switched telephone network (PSTN) from a session initiation protocol (SIP) gateway, wherein the SIP gateway translates a telephone call from a telephone coupled to the PSTN into a SIP protocol message, and wherein the SIP gateway switches the voice portion separately from the signaling information of the same telephone call;
   accepting the SIP protocol message at a SIP server coupled to the SIP gateway;
   accessing a voice extensible markup language (VXML) page at an application server on behalf of the SIP server; and
   allowing a user of the telephone to access the VXML page through a VXML gateway, wherein the VXML gateway can be de-coupled from and re-coupled to the SIP gateway during the same telephone call.

9. The method of claim 8, further comprising accessing a specified VXML page to provide a requested function from the SIP gateway for the user.

10. The method of claim 8, further comprising providing a web service message from the application server to the SIP gateway, wherein the web service message provides a connection status of the telephone call.

11. The method of claim 8, further comprising providing a web service message from the application server to the SIP gateway, wherein the web service message can be used to control the telephone call; wherein control functions include connection, disconnection, and redirection.

12. The method of claim 8, further comprising initiating telephone calls from the SIP gateway to the telephone coupled to the PSTN under control of a web server.

13. The method of claim 8, further comprising providing a web page from the application server to the user, wherein the web page can be used to control access to advanced functions, and wherein advanced functions include a wake-up call application and a stock alert application.

14. The method of claim 8, further comprising switching a voice portion of the telephone call from the VXML gateway to the user's telephone by the SIP gateway thereby releasing the VXML gateway from service when the user is not accessing the VXML page.

15. A computer-readable storage medium storing instructions that when executed by a computer cause the computer to perform a method for developing applications with telephony functionality, the method comprising:
- interfacing with a public switched telephone network (PSTN) from a session initiation protocol (SIP) gateway, wherein the SIP gateway translates a telephone call from a telephone coupled to the PSTN into a SIP protocol message, and wherein the SIP gateway switches the voice portion separately from the signaling information of the same telephone call;
- accepting the SIP protocol message at a SIP server coupled to the SIP gateway;
- accessing a voice extensible markup language (VXML) page at an application server on behalf of the SIP server; and
- allowing a user of the telephone to access the VXML page through a VXML gateway, wherein the VXML gateway can be de-coupled from and re-coupled to the SIP gateway during the same telephone call.

16. The computer-readable storage medium of claim 15, the method further comprising accessing a specified VXML page to provide a requested function from the SIP gateway for the user.

17. The computer-readable storage medium of claim 15, the method further comprising providing a web service message from the application server to the SIP gateway, wherein the web service message provides a connection status of the telephone call.

18. The computer-readable storage medium of claim 15, the method further comprising providing a web service message from the application server to the SIP gateway, wherein the web service message can be used to control the telephone call; wherein control functions include connection, disconnection, and redirection.

19. The computer-readable storage medium of claim 15, the method further comprising initiating telephone calls from the SIP gateway to the telephone coupled to the PSTN under control of a web server.

20. The computer-readable storage medium of claim 15, the method further comprising providing a web page from the application server to the user, wherein the web page can be used to control access to advanced functions, and wherein advanced functions include a wake-up call application and a stock alert application.

21. The computer-readable storage medium of claim 15, the method further comprising switching a voice portion of the telephone call from the VXML gateway to the user's telephone by the SIP gateway thereby releasing the VXML gateway from service when the user is not accessing the VXML page.

* * * * *